United States Patent [19]

Ono

[11] Patent Number: 4,591,751
[45] Date of Patent: May 27, 1986

[54] FIELD COIL ASSEMBLY FOR A DYNAMOELECTRIC MACHINE

[75] Inventor: Shoziro Ono, Isahaya, Japan

[73] Assignee: Mitsubishi Denki Kabushiki Kaisha, Tokyo, Japan

[21] Appl. No.: 616,740

[22] Filed: Jun. 4, 1984

[30] Foreign Application Priority Data

Jun. 8, 1983 [JP] Japan ............................ 58-103595

[51] Int. Cl.⁴ ............................................. H02K 1/24
[52] U.S. Cl. ...................... 310/269; 310/43; 310/45; 310/208; 310/218
[58] Field of Search ................ 310/208, 43, 45, 269, 310/179, 218, 261, 264

[56] References Cited

U.S. PATENT DOCUMENTS

| | | | |
|---|---|---|---|
| 2,870,357 | 1/1959 | Vandenberg | 310/269 |
| 2,872,605 | 2/1959 | Moore | 310/269 |
| 3,171,993 | 3/1965 | Stevens | 310/45 |
| 3,463,952 | 8/1969 | Norris | 310/269 |
| 4,028,574 | 6/1977 | Canay | 310/269 |

FOREIGN PATENT DOCUMENTS

| | | | |
|---|---|---|---|
| 0166174 | 12/1949 | Austria | 310/269 |
| 1021467 | 12/1957 | Fed. Rep. of Germany | 310/269 |
| 1136442 | 5/1957 | France | 310/269 |
| 55-69845 | 5/1980 | Japan . | |
| 55-90154 | 6/1980 | Japan . | |
| 55-94549 | 7/1980 | Japan . | |
| 0099234 | 6/1983 | Japan | 310/269 |

*Primary Examiner*—R. Skudy
*Attorney, Agent, or Firm*—Leydig, Voit & Mayer, Ltd.

[57] ABSTRACT

A magnetic coil assembly for a dynamoelectric machine comprises a magnetic field coil, a magnetic field pole core adapted to be mounted on a rotor of the dynamoelectric machine and an electrical insulation placed around the magnetic field coil. The electrical insulation is disposed only in the region between the pole core and the straight coil side portions of the magnetic coil less the coil end portion or the end turns of the coil. The magnetic pole is bevelled at the corners thereof to provide a sufficient insulting distance between the coil and the pole.

8 Claims, 9 Drawing Figures

FIELD COIL ASSEMBLY FOR A DYNAMOELECTRIC MACHINE

BACKGROUND OF THE INVENTION

This invention relates to field coil assemblies for a dynamoelectric machine and more particularly to field coil assemblies particularly useful in a salient pole rotor of a dynamoelectric machine.

In a typical dynamoelectric machine, a plurality of field coil assemblies are mounted around the circumference of a substantially cylindrical rotor or a yoke of a magnetic material adapted to be rotatable about its central axis. Each field coil assembly comprises a magnetic pole of which a radially inner end is magnetically and mechanically coupled to the rotor by means of a dove tail projection that fits in a complementary slot formed in the axial direction in the cylindrical surface of the rotor. The radially outer end of the pole has formed thereon a mushroom-shaped pole shoe portion extending in both the axial and circumferential directions at the head portion of the pole. The field coil assembly also comprises a field winding wound around the pole for generating a magnetic flux extending radially through the hole. The field winding comprises turns of a rigid conductor bar, electrical insulations between the turns, and another annular insulating member having a U-shaped cross-section that is placed on the inner peripheral surface of the coil as well as the top and the bottom surfaces of the coil. This coil assembly is sandwiched between an upper and a lower insulating collar at the top and the bottom surfaces thereof and placed around the magnetic pole of the machine. Frequently, an adjusting rigid liner which is an annular member extending over the entire flange portion of the insulating member is inserted between the lower insulating collar and the peripheral surface of the rotor.

It is a usual practice that end portions of the cylindrical rotor or the yoke are partially removed at the region facing the inner face of the end turn of the coil or the region at the axial end portions of the pole. Therefore, the end turns of the coil are not directly mechanically supported by the rotor in the radially inner direction but are cantilevered owing to the rigidity of the coil and the electrical insulations, and this cantilevered coil end portion is spaced apart by a predetermined distance from the circumferential surface of the rotor.

Therefore, if the above distance was utilized as an electrically insulating distance or gap, then the electrically insulating materials are not necessary at least at this portion of the coil, and significant reductions in the amount of insulating material and cost can be expected.

SUMMARY OF THE INVENTION

Accordingly, an object of the present invention is to provide a magnetic field coil assembly that is less expensive.

Another object of the present invention is to provide a magnetic field coil assembly that is light in weight.

Still another object of the present invention is to provide a magnetic field coil assembly that is easy to assemble.

A still further object of the present invention is to provide a magnetic field coil assembly that has a high coil cooling efficiency.

With the above objects in view, the present invention resides in a magnetic cool assembly for a dynamoelectric machine comprising a magnetic field coil, a magnetic field pole core adapted to be mounted on a rotor of the dynamoelectric machine and an electrical insulation placed around the magnetic field coil. The electrical insulation is disposed only in the region between the pole core and straighrt coil side portions of the magnetic coil and not on the coil end portion or the end turns of the coil.

DESCRIPTION OF THE PREFERRED EMBODIMENT

Figure 1:
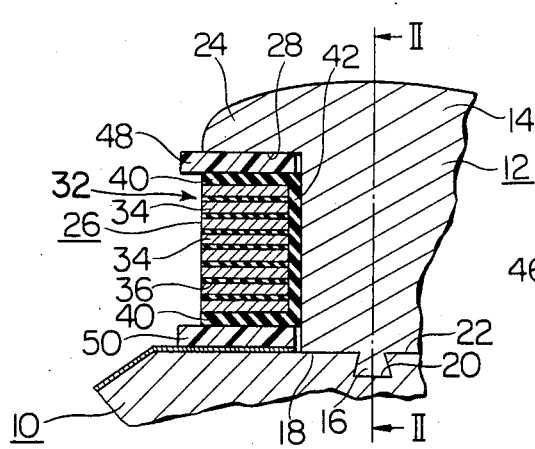
FIG. 1 is a fragmental sectional view of a magnetic field coil assembly of the present invention taken along a plane perpendicular to the central axis of the dynamoelectric machine.

Referring now to the drawings and particularly to FIGS. 1 to 4 thereof, a magnetic field coil assembly of the present invention is illustrated as applied to rotor of a dynamoelectric machine. As is well known in the art, the rotor assembly of a dynamoelectric machine typically comprises a substantially cylindrical rotor 10 rotatable about its central axis (not shown), and a plurality of magnetic field coil assemblies 12 disposed on a cylindrical surface of the rotor having equal circumferential distance therebetween.

The magnetic field coil assembly 12 comprises a magnetic pole 14 made of a magnetic material. The pole 14 has a height which is a radial length of the pole when assembled on the circumferential surface of the rotor 10 through the use of an axially extending dove-tail 16 formed on the radially inner end of the magnetic pole 14. The length of the pole 14 is an axial dimension of the magnetic pole 14 when assembled on the rotor 10, and the pole's width is the circumferential length dimension of the magnetic pole 14 when assembled on the rotor 10.

Figure 2:
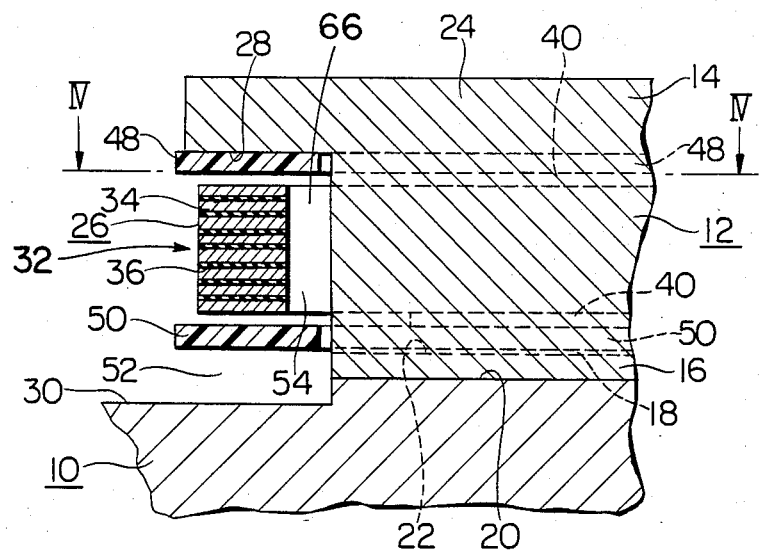
FIG. 2 is a fragmental sectional view taken along the line II—II of FIG. 1.

As shown in FIGS. 1 and 2, the dove-tail 16 of the pole 14 is formed on a flat inner surface 18 of the pole 14, and the pole 14 is magnetically and mechanically rigidly mounted on the rotor 10 by snugly inserting the dove-tail 16 into a complementary axial dove-tail groove 20 formed in a flat outer surface 22 of the rotor 10, with the inner end surface 18 off the pole 14 and the outer circumferential surface 22 of the rotor 10 intimately contacted for providing a good magnetic coupling therebetween. The magnetic pole 14 also carries a pole shoe forming a mushroom-shaped head portion 24 for the magnetic pole 14 and extends in the length and the width directions of the pole 14. Thus, the pole 14 has a substantially radially extending rectangular section formed with an annular groove for carrying the mushroom-shaped head portion 24 and for receiving therein a field winding assembly 26. In this connection it is to be noted that, as shown in FIG. 2, a portion of the material is eliminated from the rotor 10 at the position adjacent to the axial ends of the pole 14. Therefore, the length dimension between an inner face 28 of the pole head portion 24 and an flat-faced portion 30 of the rotor 10 at the axial ends of the magnetic pole 14 is greater than the length dimension between the inner face 28 of the pole head portion 24 and the outer surface 22 of the rotor 10.

Figure 4:
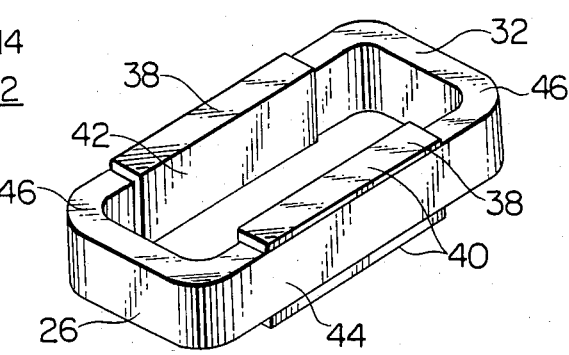
FIG. 4 is a perspective view of the magnetic field coil together with an insulating member.

The field winding assembly 26 disposed around the magnetic pole 14 comprises a substantially rectangular coil 32 formed of a plurality of turns 34 of an electrically conductive bar located within the groove and wound on the radially extending section of the pole. Each of the conductor turns 34 has side portions adjacent the side portions of the pole and end portions axially spaced from the end portions of the pole and is electrically insulated from the adjacent conductor turn 34 by an electrically insulating coating 36. It is to be noted that the conductor turns 34 are electrically insulated only at their major faces facing toward each other and no insulation is provided on the outer and the inner cylindrical surfaces of the wound coil 32. As best shown in FIGS. 1 and 4, the field winding assembly 26 also comprises insulations 38 which are rigid electrically insulating members each having a U-shaped cross section. The insulation 38 to the earth is made of a thermosetting organic material-based pre-preg material. The leg portions or upper and lower flanges 40 of the insulation 38 are placed over the top and the bottom surface of the coil 32 and the bight portion or the web 42 of the U-shaped insulation 38 is placed over respective inner surfaces of the coil 32. According to the present invention, these insulations 38 are applied only to the coil sides 44 and, therefore, the end turn portions 46 of the coil 32 are not provided with the insulations 38. This coil 32 with the insulations 38 is sandwiched between a pair of substantially rectangular annular insulating collars 48 and 50. When assembled, the radially outer insulating collar 48 is inserted between the inner surface 28 of the pole head portion 24 and the top surface of the upper flange 40 of the U shaped insulations 38, and the radially inner insulating collar 50 is placed between the outer surface 22 of the rotor 10 and the bottom surface of the lower flange 40 of the insulations 38.

Figure 3:
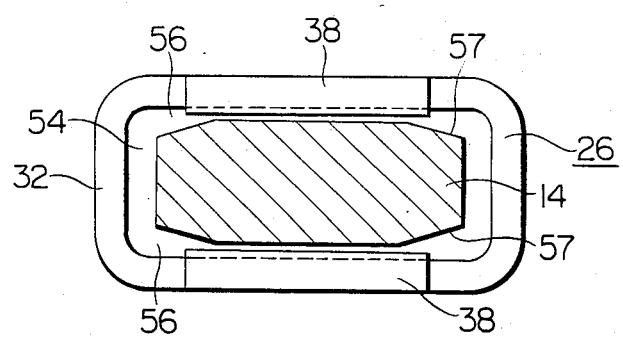
FIG. 3 is a sectional view taken along the line IV—IV of FIG. 2 showing the relationship between the coil and the pole.

As seen from FIGS. 1 to 4, the insulations 38 are only provided on the coil sides 44, with the end portions 46 not being provided with the insulations 38. Accordingly, the end portions 46 of the magnetic coil 32 is mechanically floating or cantilevered and is not mechanically supported at these portions as best shown in FIG. 2. The upper and the lower surfaces of the end portions 46 of the coil 32 are separated from the insulating collars 48 and 50, respectively by a distance corresponding to the thickness of the flange 40 of the insulation 38. From FIG. 2, it is seen that, while the upper surface of the outer insulating collar 48 is in contact with the inner surface 28 of the pole head portion 24, the lower surface of the inner insulating collar 50 is not in contact with the flat-faced portion 30 of the rotor 10 and there is a relatively large radial gap 52 between these elements 50 and 30. This radial gap 52 is sufficiently large for electrically insulating the coil 32 from the rotor portion 30. Each of the end portions 46 of the coil 32 is also axially spaced apart from the pole 14 to form an axial space 54 therebetween. The end portion 46 of the coil 32 is also circumferentially spaced apart at its corners from the magnetic pole 14 by corner spaces 56. These corner spaces 56 are formed by removing or bevelling at four radially extending corners of the magnetic pole 14 to form bevelled surfaces 57 along the corners of the magnetic pole 14 as shown in FIG. 3 thereby enlarging the axial spaces 54. Thus, the end portions 46 of the coil 32 are exposed to the surrounding atmosphere (including the atmosphere in said spaces 54) along all four faces thereof as best shown in FIG. 2.

With the above arrangement, since the end portions 46 of the coil 32 are not covered with the electrical insulations 38 and are therefore exposed, the assembled magnetic coil assembly is light-weight and less expensive as compared to the conventional design in which the end portions of the coil are provided with thick electrical insulations. Also, since the magnetic coil is exposed to the surrounding air at the end portions thereof, the cooling of the coil can be achieved more easily as compared to the conventional design, improving the cooling efficiency of the magnetic coil assembly. Further, since the insulating material is shorter, covering only portions of the coil, the assembly of the coil is easy.

Figure 5:
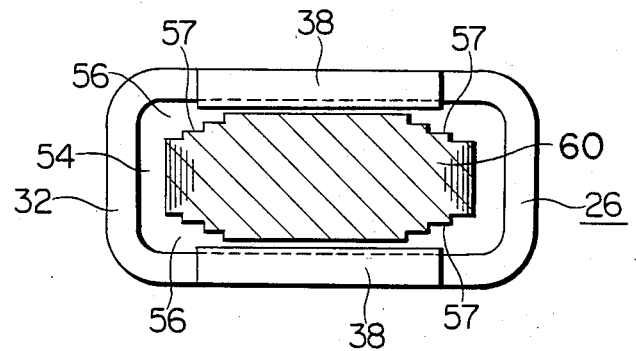
FIG. 5 is a sectional view similar to FIG. 3 showing another embodiment of the present invention.

FIG. 5 shows another embodiment of the present invention in which the magnetic pole 60 is composed of a plurality of laminated thin steel sheets and four corners are bevelled by changing the dimension of the laminated sheets so that the width of the magnetic pole 60 is incrementally reduced at its axial end portions.

Figure 6:
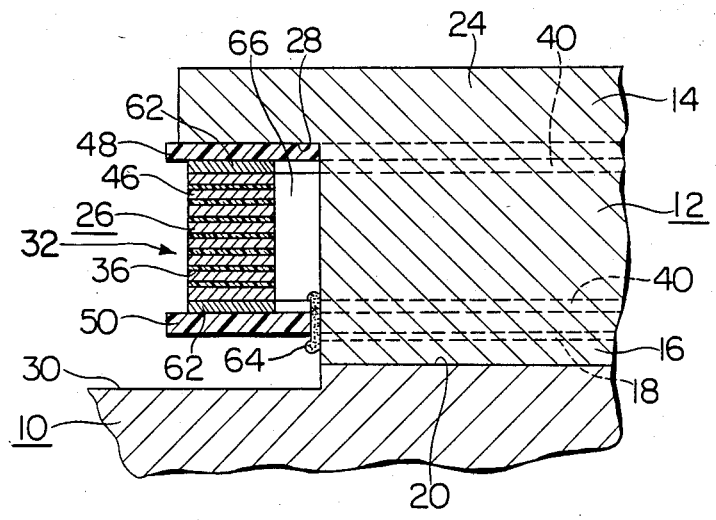
FIG. 6 is a fragmental sectional view similar to FIG. 2 showing still another embodiment of the present invention.
Figure 7:
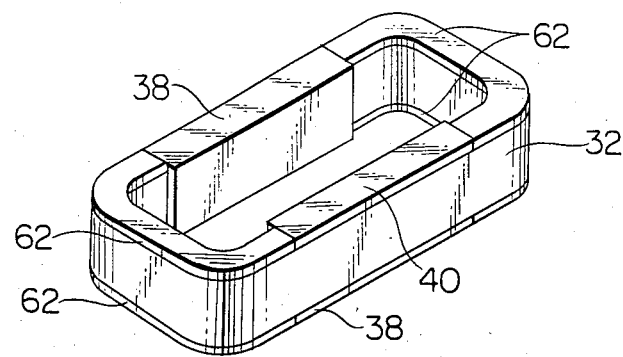
FIG. 7 is a perspective view illustrating the coil together with the associated insulations.

FIGS. 6 and 7 illustrate a still further embodiment of the present invention in which substantially U-shaped spacers 62 are interposed between the coil end portions 46 and the insulating collars 48 and 50, respectively. One of the spacers 62 is inserted between the top face of the end portion 46 of the field coil 32 and the outer insulating collar while the other spacer is inserted between the bottom face of the end portion 46 of the field coil 32 and the inner insulating collar 50. The spacers 62 may be electrically conductive or insulative and may be bonded to the ssuitable neighboring elements. As shown in FIG. 7, each of the U-shaped spacers 62 has a thickness equal to that of the flange 40 of the insulations 38, and has a shape in a plan view similar to the coil end portion 46 of the magnetic coil 32. Accordingly, in an assembled state shown in FIG. 6, the outer surfaces of the flanges 40 of the insulation 38 and the outer surfaces of the U-shaped spacers 62 are flush or in a common plane with each other. Thus, the upper surface of the coil 32 is mechanically rigidly supported by the lower face 28 of the head portion 24 so that the coil end can endure a large centrifugal force during the high speed operation of the machine. It is to be noted, however, that the air gap 52 between the radially inner insulating collar 50 and the outer surface 30 of the rotor 10 is maintained, and no electrical insulation is provided on the inside surface of the magnetic coil 32. In FIG. 6, an elastic pad 64 which may be a polyester mat serves as a filler between the magnetic pole 14 and the inner edge of the inner insulating collar 50 in order to prevent ingress of any foreign matter into an air space 66 defined between the coil 32 and the pole 14, thereby maintaining necessary dielectric strength between the coil 32 and the pole 14.

Figure 8:
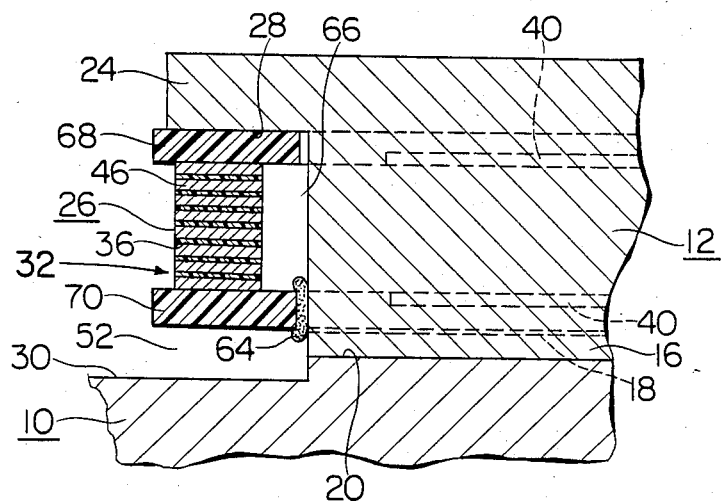
FIG. 8 is a fragmental sectional view similar to FIG. 2 illustrating still another embodiment of the invention.
Figure 9:
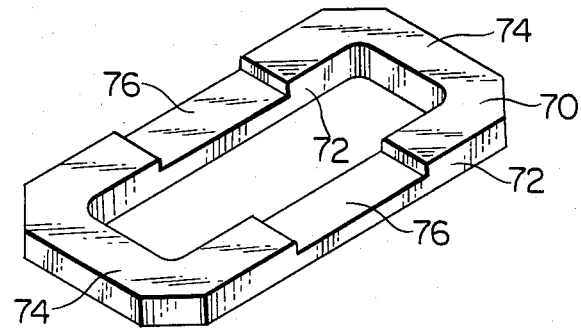
FIG. 9 is a perspective view showing a rigid insulating collar member.

FIGS. 8 and 9 illustrate still another embodiment of the present invention in which relatively thick insulating collars 68 and 70 contacting directly the coil 32 are used. The insulating collars 68 and 70 are annular plate members having two long sides 72 and two short sides 74. One collar 70 is shown in FIG. 9. Each of the long sides 72 has formed along its one major surface a reduced-thickness portion or recess 76 for receiving therein the flange portion 40 of the invention 38 which is shown in FIGS. 4 and 7. The land portions, which may be called projections, at the ends of the collars 68, 70 are in direct contact with a conductor bar in the coil end of the coil 32 as seen from FIG. 8. The depth of the recess 76 is equal to the thickness of the flange 40, as shown in FIG. 8, so that the surface of the flange 40 becomes flush with the major surface of the insulating collar 74 when assembled. With this arrangement, since the insulating collars 68 and 70 have a relatively large thickness, the coil assembly is sufficiently rigid for allowing high speed rotation of the machine.

What is claimed is:

1. A magnetic field device for a dynamoelectric machine having a rotor comprising:
   a magnetic field pole mounted on said rotor of the dynamoelectric machine and having a radially extending rectangular section formed with an annular groove and carrying a mushroom-shaped head portion;
   a substantially rectangular magnetic field coil wound on said radially extending rectangular section of said pole and located within said groove, said coil having side portions adjacent side portions of said pole and end portions, including top and bottom faces, axially spaced from end portions of said pole, said pole being bevelled at four radially extending corners between said side portions and said end portions of said pole to provide corner spaces enlarging the axial spaces between the end portions of the coil and the end portions of the pole; and
   U-shaped insulation members inserted only between said pole and coil side portions leaving said coil end portions exposed to the surrounding atmosphere including the atmosphere in said spaces.

2. A magnetic field device as claimed in claim 1 wherein each said insulation member has a substantially U-shaped cross-section including flanges adjacent the top and bottom faces of the respective side portion of the coil, and wherein said top and bottom faces of said end portions of said coil are exposed to the surrounding atmosphere.

3. A magnetic field device as claimed in claim 1 further including a pair of insulating collars having end portions adjacent the top and bottom faces of the end portions of the coil, and a filler disposed between an end portion of one of said insulating collars and an end portion of said pole.

4. A magnetic field device as claimed in claim 3 wherein said filler comprises an elastic pad material.

5. A magnetic field device as claimed in claim 3 wherein said filler comprises an electrically insulating material.

6. A magnetic field device as claimed in claim 1 further including an outer insulating collar disposed between the top face of the end portion of said field coil and the pole head portion, an inner insulating collar disposed between the bottom face of the end portion of said field coil and said rotor, and a spacer inserted between said top face of said end portion of said field coil and said outer insulating collar, and a second spacer inserted between said bottom face of said end portion of said field coil and said inner insulating collar, the thickness of the spacers being equal to that of the flanges of the insulation members such that the outer surfaces of the insulation members and the flanges are flush, and the coil is rigidly suppported by the pole head portion.

7. A magnetic field device as claimed in claim 6 wherein said spacers are made of one of an electrically conductive material and an electrically insulating material.

8. A magnetic field device as claimed in claim 1 further including substantially rectangular insulating collars disposed between the top and bottom faces of said field coil and the pole head portion and rotor, respectively, said collars having projections at end portions thereof in contact with the field coil.

* * * * *